(12) United States Patent
Osawa et al.

(10) Patent No.: US 11,070,719 B2
(45) Date of Patent: Jul. 20, 2021

(54) IMAGE CAPTURE ASSIST DEVICE AND IMAGE CAPTURE ASSIST METHOD

(71) Applicant: MITSUBISHI ELECTRIC CORPORATION, Tokyo (JP)

(72) Inventors: Shunya Osawa, Tokyo (JP); Hirohiko Higuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 64 days.

(21) Appl. No.: 16/603,129

(22) PCT Filed: May 10, 2017

(86) PCT No.: PCT/JP2017/017709
§ 371 (c)(1),
(2) Date: Oct. 4, 2019

(87) PCT Pub. No.: WO2018/207287
PCT Pub. Date: Nov. 15, 2018

(65) Prior Publication Data
US 2020/0120268 A1 Apr. 16, 2020

(51) Int. Cl.
*H04N 5/232* (2006.01)
*H04N 5/225* (2006.01)

(52) U.S. Cl.
CPC . *H04N 5/23222* (2013.01); *H04N 2005/2255* (2013.01)

(58) Field of Classification Search
CPC ....... H04N 5/23222; H04N 2005/2255; H04N 5/23216; H04N 5/23218; G06K 9/3233; G06K 9/4671; G03B 15/00
See application file for complete search history.

(56) References Cited

U.S. PATENT DOCUMENTS

2015/0146011 A1* 5/2015 Tsubusaki .......... H04N 5/23219
348/169
2015/0296132 A1* 10/2015 Kumano ................. G02B 7/28
348/222.1

FOREIGN PATENT DOCUMENTS

JP 2009065577 A * 3/2009
JP 2011-250131 A 12/2011
JP 2014045404 A * 3/2014

* cited by examiner

*Primary Examiner* — Sinh Tran
*Assistant Examiner* — Zhenzhen Wu
(74) *Attorney, Agent, or Firm* — Birch, Stewart, Kolasch & Birch, LLP

(57) ABSTRACT

An image capture assist device includes a moving speed determining unit that determines whether or not a moving speed of a camera is greater than or equal to a threshold, a target outline determining unit that, if the moving speed determining unit has determined that the moving speed of the camera is greater than or equal to the threshold, determines, on a basis of a capture image obtained from the camera, whether a candidate inspection target, being an object that may be a target to be inspected, appears in the capture image, a moving speed instruction unit that, if the target outline determining unit has determined that the candidate inspection target appears in the capture image, outputs an instruction to reduce the moving speed of the camera, a target type determining unit that, if the moving speed determining unit has determined that the moving speed of the camera is less than the threshold, determines a type of a target appearing in the capture image on a basis of the capture image, and a shooting location determining unit that determines whether the type of the target determined by the target type determining unit matches a type of an inspection target to be currently inspected, and if the type of the target matches the type of the inspection target, deter- (Continued)

mines that a current location of the camera is a shooting location, and outputs an instruction to stop a movement of the camera.

7 Claims, 11 Drawing Sheets

FIG. 3

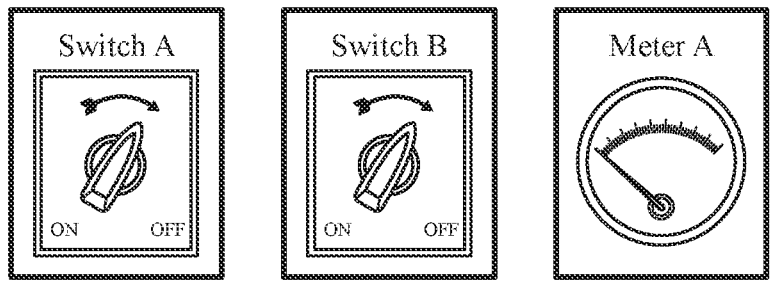

FIG. 4

| Procedure ID | Work Place | Work Object | Target | Operation Details |
|---|---|---|---|---|
| P1 | Electric Room A | Panel A | Switch A | Confirm That Switch A Is In OFF State |
| P2 | | | Switch B | Confirm That Switch B Is In OFF State |
| P3 | | | Meter A | Confirm That Value Of Meter A Is In Normal Range Of 550 A To 650 A |
| P4 | | Panel B | Switch P | Confirm That Switch P Is In OFF State |
| P5 | | | Switch Q | Confirm That Switch Q Is In ON State |
| P6 | | | Meter B | Confirm That Value Of Meter B Is In Normal Range Of 400 A To 450 A |
| ⋮ | ⋮ | ⋮ | ⋮ | ⋮ |

FIG. 10
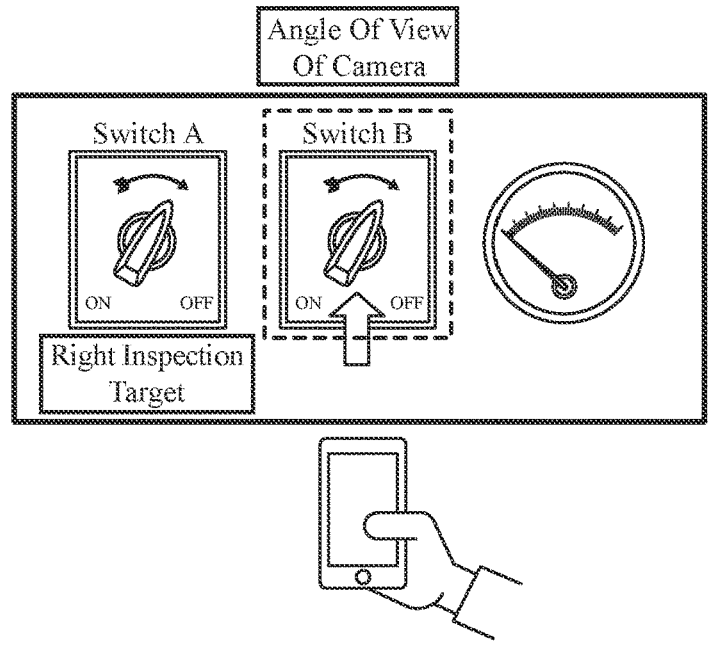
FIG. 11A
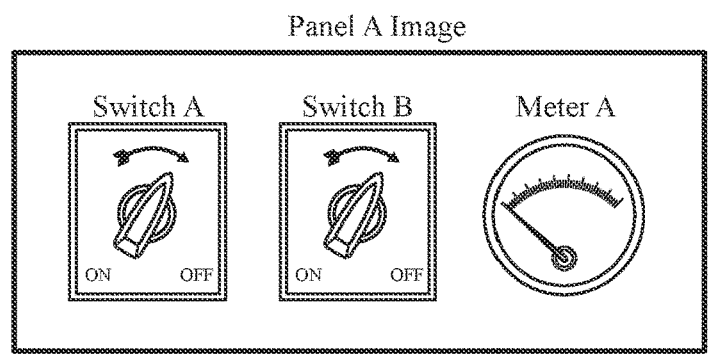
FIG. 11B
| Target Image | Target | Center Coordinate Set Of Inspection Target In Image |
|---|---|---|
| Panel A Image | Switch A | (100,100) |
| | Switch B | (200,100) |
| | Meter A | (300,100) |
| Panel B Image | Switch P | (400,100) |
| | Switch Q | (500,100) |
| | Meter B | (600,100) |
| ⋮ | ⋮ | ⋮ |

IMAGE CAPTURE ASSIST DEVICE AND IMAGE CAPTURE ASSIST METHOD

TECHNICAL FIELD

This invention relates to an image capture assist device and an image capture assist method for assisting an image capturing operation by a camera.

BACKGROUND ART

Machinery such as a water treatment facility, a plant facility, a power generation facility, or a building facility needs maintenance and inspection operations. During maintenance and inspection of these types of machinery, a worker may need to check the state of a meter or the like installed in a place that cannot be directly observed. In such case, one solution is for the worker to, for example, carry a camera, move the camera to a location expected to allow an image to be captured of the meter or the like, and check the state of the meter or the like from a photo taken at that location. However, this solution requires the worker to repeat an operation many times to capture an image at a location expected to allow an image to be captured of a target such as a meter, to observe the photo taken, and to check a condition such as whether the target is framed within an appropriate angle range.

Accordingly, a technology is demanded that assists a worker in an image capturing operation to capture, in a frame within an appropriate angle range, an image of a target that cannot be directly observed (hereinafter also referred to as "unobservable target").

Patent Literature 1 discloses an image capturing device that when a user, upon taking a selfie by a mobile phone camera, cannot check whether the user's face is framed within the angle of view using the liquid crystal screen, detects the direction of the face on the basis of the image displayed in the mobile phone camera, compares that direction with a direction of the face having been set by the user and previously stored, and encourages the user to move the mobile phone camera to match both directions with each other by means of voice guidance, thereby enabling the user to take a selfie in an intended direction.

CITATION LIST

Patent Literatures

Patent Literature 1: JP 2011-250131 A

SUMMARY OF INVENTION

Technical Problem

When a worker tries to capture an image of an unobservable target for the purpose of maintenance and inspection of machinery, the worker searches by touch for an unobservable target or a location expected to allow an image to be captured of the unobservable target, which is likely to cause defocusing or blurring in the image captured by the camera. Thus, even if the technology adopted in the image capturing device disclosed in Patent Literature 1 is applied to image capturing of an unobservable target during maintenance and inspection, defocusing or blurring caused in an image captured by the camera prevents the unobservable target from being accurately detected. This prevents appropriate guidance from being provided. That is, a problem exists in that a conventional technology still fails to assist a worker in an image capturing operation to an extent that allows the worker to capture an image of an unobservable target in a frame within an appropriate angle range.

This invention has been made to solve the problem as described above, and it is an object of this invention to provide an image capture assist device and an image capture assist method each capable of assisting a user in an image capturing operation to enable the user to capture an image of an unobservable target in a frame within an appropriate angle range.

Solution to Problem

An image capture assist device according to this invention includes processing circuitry to determine whether or not a moving speed of a camera is greater than or equal to a threshold, if it has been determined that the moving speed of the camera is greater than or equal to a threshold, to determine, on a basis of a capture image obtained from the camera, whether a candidate inspection target, being an object that may be a target to be inspected, appears in the capture image, it has been determined that the candidate inspection target appears in the capture image, outputting to output an instruction to reduce the moving speed of the camera, if it has been determined that the moving speed of the camera is less than the threshold, to determine a type of a target appearing in the capture image on a basis of the capture image, and to determine whether the type of the target determined matches a type of an inspection target to be currently inspected, and if the type of the target matches the type of the inspection target, to determine that a current location of the camera is a shooting location, and to output an instruction to stop a movement of the camera.

Advantageous Effects of Invention

This invention enables a user to capture an image of an unobservable target in a frame within an appropriate angle range.

BRIEF DESCRIPTION OF DRAWINGS

FIG. 3 is a diagram illustrating an example of detailed image data stored in a detailed image DB in this first embodiment.

FIG. 4 is a chart illustrating an example of inspection procedure data stored in an inspection procedure DB in this first embodiment.

FIG. 10 is a diagram for describing an example of a case in which a target captured in a current angle of view of the camera is not a right inspection target in the second embodiment.

FIG. 11 is a set of diagrams illustrating an example of target location data stored in a target location DB in this second embodiment; FIG. 11A is a diagram illustrating image data that depicts inspection targets using a two-dimensional or three dimensional point cloud model or the like, and FIG. 11B is a chart illustrating information of center coordinate sets of respective inspection targets on the two-dimensional image or three-dimensional point cloud model.

DESCRIPTION OF EMBODIMENTS

Embodiment of this invention will be described in detail below with reference to the drawings.

First Embodiment

Figure 1:
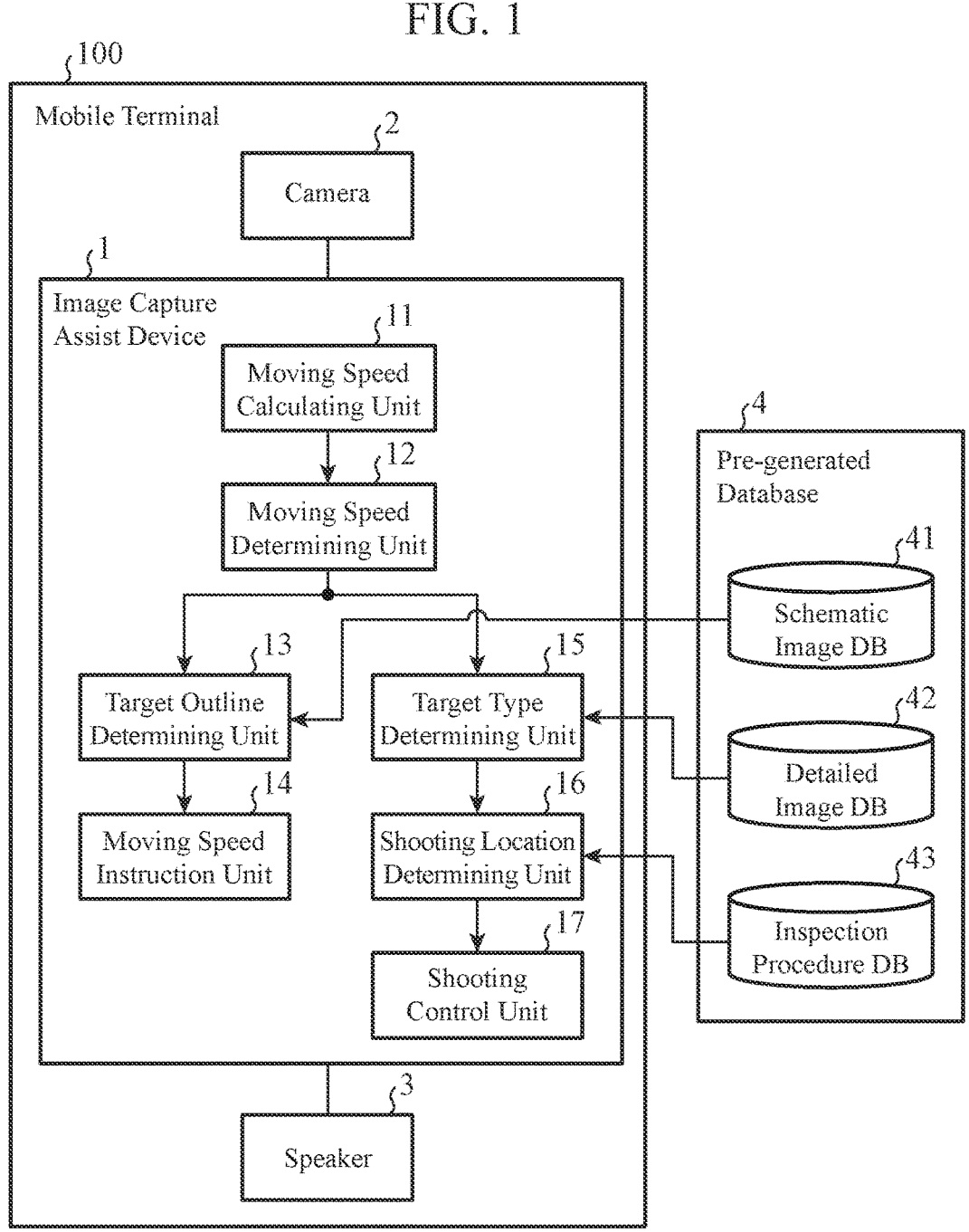
FIG. 1 is a block diagram illustrating a functional configuration of an image capture assist device according to a first embodiment.

FIG. 1 is a block diagram illustrating a functional configuration of an image capture assist device 1 according to a first embodiment.

The image capture assist device 1 is disposed in a mobile terminal 100, such as a smartphone or a tablet, that includes a camera 2, a certain type of sensor (not shown) such as an acceleration sensor or a gyro sensor, and a speaker 3.

This first embodiment assumes, by way of example, that the mobile terminal 100 including the image capture assist device 1 is a mobile terminal carried by a worker when the worker performs maintenance and inspection operations of machinery. Note that the term "machinery" as used herein refers to, for example, a water treatment facility, a plant facility, a power generation facility, or a building facility. In addition, the worker is also a user of the mobile terminal 100 including the image capture assist device 1.

During maintenance and inspection operations, a worker checks the state of a target (unobservable target), such as a meter, installed in a place that the worker cannot directly observe. In this situation, the worker, for example, holds the mobile terminal 100 in hand, searches by touch for the unobservable target or a location expected to allow an image to be captured of the unobservable target, captures an image of the unobservable target by the mobile terminal 100, and observes the captured image of the unobservable target to check the state of the unobservable target, thereby performing maintenance and inspection operations.

The image capture assist device 1 assists a worker in an image capturing operation during maintenance and inspection operations so that the worker can capture an image of an unobservable target in a frame within an appropriate angle range.

Note that this first embodiment assumes that there are multiple unobservable targets, and that the worker captures images of the respective unobservable targets in a predetermined order, and observes the capture images to check the states of the respective unobservable targets, thereby performing maintenance and inspection operations.

The image capture assist device 1 includes a moving speed calculating unit 11, a moving speed determining unit 12, a target outline determining unit 13, a moving speed instruction unit 14, a target type determining unit 15, a shooting location determining unit 16, and a shooting control unit 17.

In addition, the image capture assist device 1 accesses a pre-generated database (DB) 4, which has been generated in advance by an administrator, the worker, or the like, and obtains various information stored in the pre-generated DB 4. The pre-generated DB 4 is provided in a location, for example, where the image capture assist device 1 can access via a network. The pre-generated DB 4 includes a schematic image DB 41, a detailed image DB 42, and an inspection procedure DB 43. The schematic image DB 41, the detailed image DB 42, and the inspection procedure DB 43 will be described in detail later.

The moving speed calculating unit 11 calculates the speed of the hand (hereinafter, hand's speed) on the basis of information obtained from a certain type of sensor, such as an acceleration sensor or a gyro sensor, provided in the mobile terminal 100. In this first embodiment, the term "hand's speed" refers to the moving speed of the hand of the worker who holds the mobile terminal 100 in hand, and operates the mobile terminal 100 to capture an image of a target. That is, the moving speed of the hand is nearly the same as the moving speed of the camera 2 of the mobile terminal 100. The description below describes the moving speed of the camera 2 using the wording "hand's speed" of the worker.

The moving speed calculating unit 11 outputs information about the hand's speed calculated, to the moving speed determining unit 12.

The moving speed determining unit 12 determines whether the hand's speed is greater than or equal to a predetermined speed (hereinafter also referred to simply as "threshold") on the basis of the information about the hand's speed, output from the moving speed calculating unit 11. In this first embodiment, the term "predetermined speed" refers to a lower limit of the range of the hand's speed in which defocusing or blurring is likely to occur in an image captured by the camera (hereinafter referred to as "capture image"). The term "capture image" as used herein refers to, with respect to a digital camera, an image captured by the camera and displayed in a liquid crystal screen or the like thereof to check the imaged region using the liquid crystal screen or the like before the user performs shooting. The administrator, the worker, or the like calculates the predetermined speed on the basis of information such as a focal distance at which defocusing or blurring is likely to occur in a capture image, or availability of image stabilizer function, and sets the predetermined speed in advance in a predetermined speed storing unit (not shown) disposed in a location where the image capture assist device 1 can access. This first embodiment assumes, by way of example, that the camera 2 is a camera having a frame rate of 30 flames per second (FPS), and that the administrator, the worker, or the like sets the predetermined speed to 30 cm per second, on an assumption that a hand movement at a rate of 1 cm per frame causes blurring, thereby preventing determination of the type of the unobservable target.

The moving speed determining unit 12 outputs information about the determination result of whether the hand's speed is greater than or equal to the predetermined speed, to the target outline determining unit 13 and to the target type determining unit 15.

If the moving speed determining unit 12 determines that the hand's speed is greater than or equal to the predetermined speed, the target outline determining unit 13 checks the profile of the object appearing in the capture image on the basis of the capture image obtained from the camera 2, and of schematic image data stored in the schematic image DB 41, and thus makes a rough determination of whether an unobservable target appears in the capture image. Specifically, the target outline determining unit 13 checks whether the profile of the object appearing in the capture image has, for example, a predetermined simple shape, such as "○ (circle)" or "□ (rectangle)", corresponding to the unobservable target, to determine whether the unobservable target appears in the capture image (a process of performing such determination is herein also referred to as "to determine the outline"). The target outline determining unit 13 checks, for example, whether the profile of the object appearing in the capture image has the predetermined shape such as "○ (circle)" or "□ (rectangle)" by using template matching using the schematic image data as a template image. If the template matching has confirmed that, in the capture image, an object that matches the shape defined in the schematic image data appears, the target outline determining unit 13 determines that an object seeming to be the unobservable target appears in the capture image. A hand's speed greater than or equal to the predetermined speed causes defocusing or blurring in the capture image, which makes it difficult to accurately identify the object appearing in the capture image. Accordingly, the target outline determining unit 13 makes a rough determination of whether an unobservable target appears in the capture image using the method described above. Thus, a determination made by the target outline determining unit 13 is a rough determination, and is not intended to ultimately determine whether the object appearing in the capture image is the unobservable target. The target outline determining unit 13 makes a determination on a candidate object (hereinafter referred to as "candidate inspection target") for the unobservable target that is a target to be inspected.

Note that the image capture assist device 1 includes an acquisition unit (not shown) that acquires the capture image from the camera 2. The target outline determining unit 13 then obtains the capture image from the acquisition unit. The capture image will be described in detail later.

Figure 2:
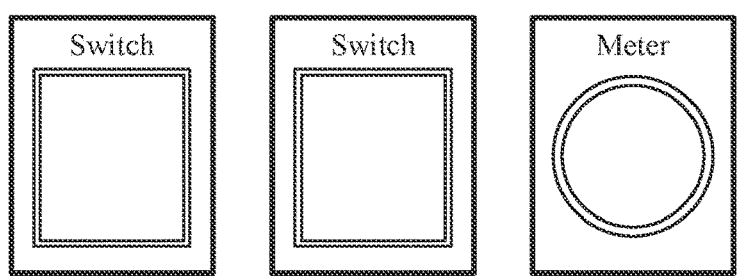
FIG. 2 is a diagram illustrating an example of schematic image data stored in a schematic image DB in this first embodiment.

Now FIG. 2 is a diagram illustrating an example of schematic image data stored in the schematic image DB 41 in this first embodiment.

As illustrated in FIG. 2, the schematic image DB 41 stores, for example, image data, such as a circular image of the outer frame shape of a meter, or a rectangular image of the outer frame shape of a switch, as the schematic image data. The meter, switch, or the like is installed in a place that the worker cannot directly observe, but is to be inspected, and is an example of unobservable targets. The schematic image DB 41 stores image data that represents the profile of the outer frame shape or the like of each of the unobservable targets, as the schematic image data.

Note that although this first embodiment assumes that the target outline determining unit 13 determines whether a candidate inspection target appears in the capture image using the method described above, the method used by the target outline determining unit 13 to determine whether a candidate inspection target appears in the capture image is not limited thereto. For example, the target outline determining unit 13 may use a conventional Hough transform technique to check whether a shape of "○ (circle)" appears. Alternatively, when the unobservable target is, for example, a meter or the like having a marker such as a QR code (registered trademark; this annotation will hereinafter be omitted) attached thereon, the target outline determining unit 13 may determine whether a candidate inspection target appears in the capture image by checking whether a rectangle of the outer frame shape of the marker appears in the capture image.

When it can be determined that a candidate inspection target appears in the capture image, the target outline determining unit 13 outputs the determination result thereof to the moving speed instruction unit 14.

Upon output of the determination result indicating that a candidate inspection target appears in the capture image from the target outline determining unit 13, the moving speed instruction unit 14 outputs voice data to the speaker 3, and the speaker in turn outputs a voice on the basis of the voice data. This voice data represents a voice that instructs the worker to decelerate the movement of the hand. Specifically, for example, the moving speed instruction unit 14 causes the speaker 3 to output a voice message saying, "The target is near here. Move your hand slowly." Note that this is merely by way of example, and the moving speed instruction unit 14 may announce that a candidate inspection target is in the vicinity using a sound effect such as a beep.

If the moving speed determining unit 12 determines that the hand's speed is less than the predetermined speed, the target type determining unit 15 compares the capture image with detailed image data stored in the detailed image DB 42 to determine the type of the unobservable target appearing in the capture image. The target type determining unit 15 performs, for example, template matching using the detailed image data as the template image to determine the type of the object. A hand's speed less than the predetermined speed will cause no defocusing or blurring in the capture image, thereby enabling the object appearing in the capture image to be accurately identified. That is, when an unobservable target appears in the capture image, the target type determining unit 15 can determine the type of that unobservable target.

Now FIG. 3 is a diagram illustrating an example of the detailed image data stored in the detailed image DB 42 in this first embodiment.

As illustrated in FIG. 3, the detailed image DB 42 stores, as the detailed image data, data of an image in which a target appears clearly, such as, for example, an image of a meter, or an image of a switch. The detailed image DB 42 stores data of an image in which an unobservable target appears clearly, as detailed image data.

Note that when, for example, a device completely identical to an unobservable target is installed next to that unobservable target in a practical implementation, the type of the unobservable target may be determined on the basis of the difference in the template image after addition of peripheral information to the template image. When completely identical devices are installed side by side, and each have a marker such as a QR code attached thereto, the target type determining unit 15 may detect the marker to determine the type of the unobservable target on the basis of the marker.

The target type determining unit 15 outputs the determination result of the type of the unobservable target to the shooting location determining unit 16.

The shooting location determining unit 16 determines the shooting location for capturing an image of the unobservable target on the basis of the determination result of the type of the unobservable target, output from the target type determining unit 15, and causes the speaker 3 to output an instruction for the worker to stop the hand in a form of voice or the like. Specifically, the shooting location determining unit 16 determines whether the unobservable target appearing in the capture image matches the unobservable target to be currently inspected defined in inspection procedure data, on the basis of the unobservable target identified by the target type determining unit 15 and of the inspection procedure data stored in the inspection procedure DB 43, and if a match is found, determines that the current hand's location is the shooting location. In this first embodiment, the unobservable target to be currently inspected by the worker, identified from the inspection procedure data, is referred to also as "inspection target".

The shooting location determining unit 16 causes the speaker 3 to output a voice that instructs the worker to stop the hand at the current location.

Now FIG. 4 is a chart illustrating an example of the inspection procedure data stored in the inspection procedure DB 43 in this first embodiment.

As illustrated in FIG. 4, the inspection procedure DB 43 contains definitions of inspection procedures indicating what operations are performed on which unobservable targets in what order.

FIG. 4 illustrates, by way of example, procedure identifiers (IDs) assigned to respective operations, and the operations corresponding to the procedure IDs listed in ascending order of the procedure IDs. It is assumed here that the worker performs the operations corresponding to the procedure IDs in ascending order of the procedure IDs.

Information of operation details is, for example, displayed in text form on a display unit (not shown) of the mobile terminal 100. The worker carries out an inspection operation by confirming the text description, and searching by touch for the unobservable target to be inspected or a location expected to allow an image to be captured of the unobservable target, holding in hand the mobile terminal 100.

Then, after completion of the inspection operation, the worker enters the inspection result through an input unit (not shown), such as a touch panel, of the mobile terminal 100. In this operation, the worker enters the inspection result in such a manner that the unobservable target for which the inspection operation is completed will be indicated. For example, the worker may enter the inspection result in association with the name of the unobservable target, or may enter the inspection result in association with the procedure ID.

When the inspection result is entered, a result marking unit (not shown) of the mobile terminal 100, for example, sets an inspection completion flag for the corresponding procedure ID in the inspection procedure data.

The shooting location determining unit 16 refers to the inspection procedure data, determines that the unobservable target corresponding to the lowest procedure ID among the unobservable targets corresponding to procedure IDs each of whose inspection completion flag is unset is an inspection target that is the unobservable target to be currently inspected, and thus determines whether that inspection target matches the unobservable target identified by the target type determining unit 15.

Note that the inspection completion flag is cleared, for example, when the worker enters information indicating that the inspection operation is complete, when the mobile terminal 100 is powered off, or in a similar case.

Note that FIG. 4 illustrates the inspection procedure data as containing the procedure IDs each associated with a work place, a work object, an unobservable target, and operation details, but this is merely by way of example, and other types of information may also be associated and defined. It is sufficient that the worker can be informed what operation is to be performed on which unobservable target, on the basis of the inspection procedure data. Note that the work objects in FIG. 4 refer to a control panel, a distribution panel, or the like having the unobservable targets provided thereon.

After determination of the shooting location, the shooting location determining unit 16 causes the speaker 3 to output information indicating that the inspection target has been detected and an instruction to stop the hand, in a form of voice. Specifically, the shooting location determining unit 16 causes, for example, the speaker 3 to output a voice message saying, "Meter A was detected. Please stop your hand". Note that this is merely by way of example, and the shooting location determining unit 16 may causes the speaker 3 or the like to output information indicating that the inspection target has been detected and an instruction to stop the hand, by using a sound effect such as a series of beeps.

In addition, when the unobservable target identified by the target type determining unit 15 does not match the inspection target defined in the inspection procedure data, the shooting location determining unit 16 causes, for example, the speaker 3 to output a notification indicating that the unobservable target detected is not the inspection target. Specifically, the shooting location determining unit 16 causes, for example, the speaker 3 to output a voice message saying, "Meter B was detected. This is not the target to be currently inspected". The shooting location determining unit 16 causes the speaker 3 to output such notification to instruct the worker to again search for an unobservable target that is the inspection target.

Moreover, upon determination of the shooting location, the shooting location determining unit 16 outputs a location determination notification indicating that the shooting location has been determined, to the shooting control unit 17.

Upon output of the location determination notification from the shooting location determining unit 16, the shooting control unit 17 controls the camera 2 to release the shutter at the location at the time of the acquisition of that location determination notification, as the shooting location. This causes the camera 2 to automatically release the shutter to take a photo.

An operation of the image capture assist device 1 according to this first embodiment will next be described.

Figure 5:
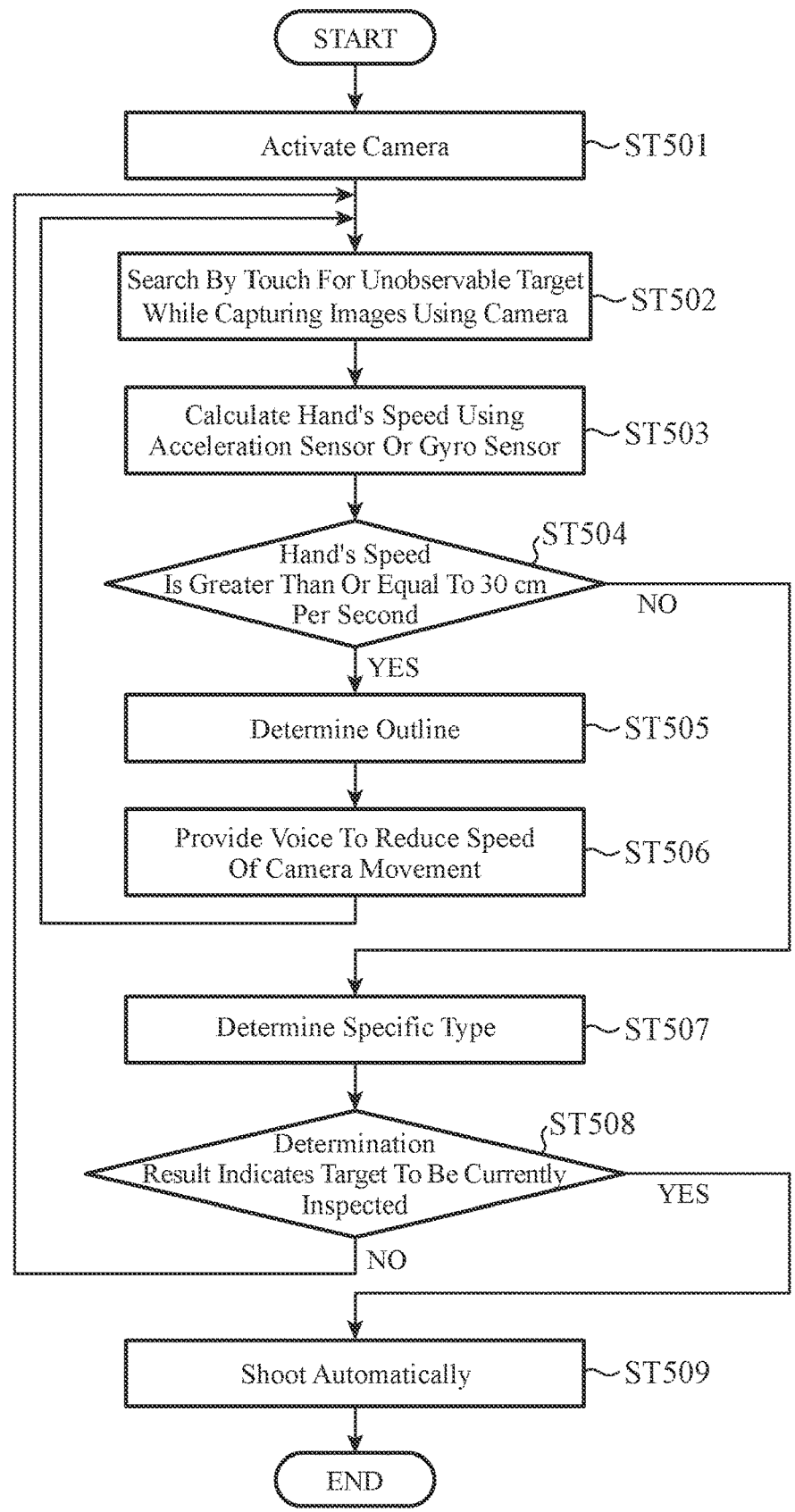
FIG. 5 is a flowchart for describing an overall operation of the image capture assist device according to this first embodiment.

FIG. 5 is a flowchart for describing an overall operation of the image capture assist device 1 according to this first embodiment.

The worker operates the mobile terminal 100 to activate the camera 2.

After activation of the camera 2 (step ST501), the worker searches by touch for the unobservable target or a location expected to allow an image to be captured of the unobservable target (step ST502). In this operation, the worker searches for the unobservable target while causing the camera 2 to capture images. The capture images are sequentially output from the camera 2 to an acquisition unit (not shown) of the image capture assist device 1. The acquisition unit of the image capture assist device 1 obtains a capture image, and outputs the capture image to the moving speed calculating unit 11, to the target outline determining unit 13, and to the target type determining unit 15.

The moving speed calculating unit 11 calculates the hand's speed on the basis of information obtained from a certain type of sensor, such as an acceleration sensor or a gyro sensor, included in the mobile terminal 100 (step ST503). The moving speed calculating unit 11 outputs information about the hand's speed calculated, to the moving speed determining unit 12.

The moving speed determining unit 12 determines whether the hand's speed is greater than or equal to a predetermined speed (threshold) on the basis of the information about the hand's speed output from the moving speed calculating unit 11 at step ST503 (step ST504). In this example, the moving speed determining unit 12 determines whether the hand's speed is greater than or equal to 30 cm per second.

Note that, in this first embodiment, the moving speed calculating unit 11 calculates the hand's speed, and the moving speed determining unit 12 determines whether the hand's speed calculated by the moving speed calculating unit 11 is greater than or equal to a predetermined speed, but this operation is not limited thereto. For example, if the moving speed of the mobile terminal 100, i.e., the hand's moving speed, is calculated in the mobile terminal 100 itself, the moving speed determining unit 12 may be configured to obtain the information about the hand's moving speed from the mobile terminal 100, and to determine whether the hand's speed is greater than or equal to a predetermined speed.

At step ST504, if it is determined that the hand's speed is greater than or equal to the predetermined speed ("YES" at step ST504), the target outline determining unit 13 determines whether a candidate inspection target appears in the capture image on the basis of the capture image obtained from the acquisition unit and of the schematic image data stored in the schematic image DB 41 (step ST505). The target outline determining unit 13 outputs the determination result of whether a candidate inspection target appears in the capture image, to the moving speed instruction unit 14.

Upon output of the determination result of whether a candidate inspection target appears in the capture image from the target outline determining unit 13 at step ST505, the moving speed instruction unit 14 causes the speaker 3 to output information indicating that there is a candidate inspection target, and an instruction to decelerate the hand's movement, in a form of voice or the like (step ST506).

The process then returns to step ST502.

Note that if the target outline determining unit 13 determines that no candidate inspection target appears in the capture image, the target outline determining unit 13 repeats the operation of step ST505 until it is determined that a candidate inspection target appears in the capture image.

On the other hand, if it is determined that the hand's speed is less than the predetermined speed at step ST504 ("NO" at step ST504), the target type determining unit 15 compares the capture image obtained from the acquisition unit with the detailed image data stored in the detailed image DB 42 to determine the type of the unobservable target appearing in the capture image (step ST507).

The target type determining unit 15 outputs the determination result of the type of the unobservable target to the shooting location determining unit 16.

The shooting location determining unit 16 determines whether the unobservable target appearing in the camera image matches the inspection target that is the target to be currently inspected defined in the inspection procedure data, on the basis of the unobservable target identified by the target type determining unit 15 at step ST507 and of the inspection procedure data stored in the inspection procedure DB 43 (step ST508).

If the unobservable target identified by the target type determining unit 15 matches the inspection target at step ST508 ("YES" at step ST508), the shooting location determining unit 16 determines that the current hand's location is the shooting location. The shooting location determining unit 16 then causes the speaker 3 to output an instruction for the worker to stop the hand.

In addition, the shooting location determining unit 16 outputs a location determination notification indicating that the shooting location has been determined, to the shooting control unit 17.

Upon output of the location determination notification from the shooting location determining unit 16, the shooting control unit 17 controls the camera 2 to release the shutter at the location at the time of the acquisition of that location determination notification, as the shooting location (step ST509).

On the other hand, if the unobservable target identified by the target type determining unit 15 does not match the inspection target defined in the inspection procedure data at step ST508 ("NO" at step ST508), the shooting location determining unit 16 causes, for example, the speaker 3 to output a notification indicating that the unobservable target identified is not the inspection target to be currently inspected, such as a notification saying, "Meter B was detected. This is not the target to be currently inspected." to instruct the worker to again search for the inspection target. The process then returns to step ST502.

For example, when the worker is to take and record a photo of a water meter or the like disposed in an unobservable place during meter reading, the meter or the like to be inspected itself is disposed in a non-directly observable location, which requires the worker to take a photo thereof while searching for the meter or the like by touch. Thus, defocusing or blurring is likely to occur in the capture image. Defocusing or blurring caused in a capture image makes it difficult to accurately identify the object appearing in the capture image. In particular, a situation in which multiple similar meters or the like exist creates more difficulty in identifying the object appearing in the capture image.

Even worse, an insufficient distance between the camera 2 of the mobile terminal 100 held in hand by the worker and the meter or the like may cause only a part of the meter or the like to appear in the capture image. In this case, the unobservable target cannot be recognized by applying a technique that identifies location information of the meter or the like that is the unobservable target from a capture image covering a wide range.

Meanwhile, a reduction in the hand's speed in searching for the meter or the like by the worker reduces the possibility of occurrence of defocusing or blurring, but will increase the time required for the worker to find the meter or the like.

Thus, as described above, when the speed of hand's movement is greater than or equal to a predetermined speed, the image capture assist device 1 according to this first embodiment first guides the hand's movement so that the target will be framed within an angle range of the capture image taken by the camera during a search for the unobservable target by the worker, determines whether a candidate inspection target appears in that capture image, and if a candidate inspection target appears therein, notifies the worker of the situation. In this operation, the image capture assist device 1 instructs the worker to decelerate the hand's movement, and when the speed of hand's movement of the worker falls below the predetermined speed, determines the type of the unobservable target, and determines the shooting location.

As described above, the image capture assist device 1 guides the hand's movement in two stages depending on the hand's speed of the worker, and thus prevents a situation in which defocusing or blurring caused by a high hand's speed results in failure of identification of the type of the unobservable target; and when the type of the unobservable target can be appropriately identified, the image capture assist device 1 determines the shooting location.

This enables the worker to capture an image of the unobservable target in a frame within an appropriate angle range in shooting of the unobservable target. In addition, an image capturing operation by the worker based on guidance enables an image of an unobservable target to be captured at a constant angle irrespective of the worker.

Operations of the target outline determining unit 13 and of the moving speed instruction unit 14 of the image capture assist device 1 according to this first embodiment will now be described in detail.

Figure 6:
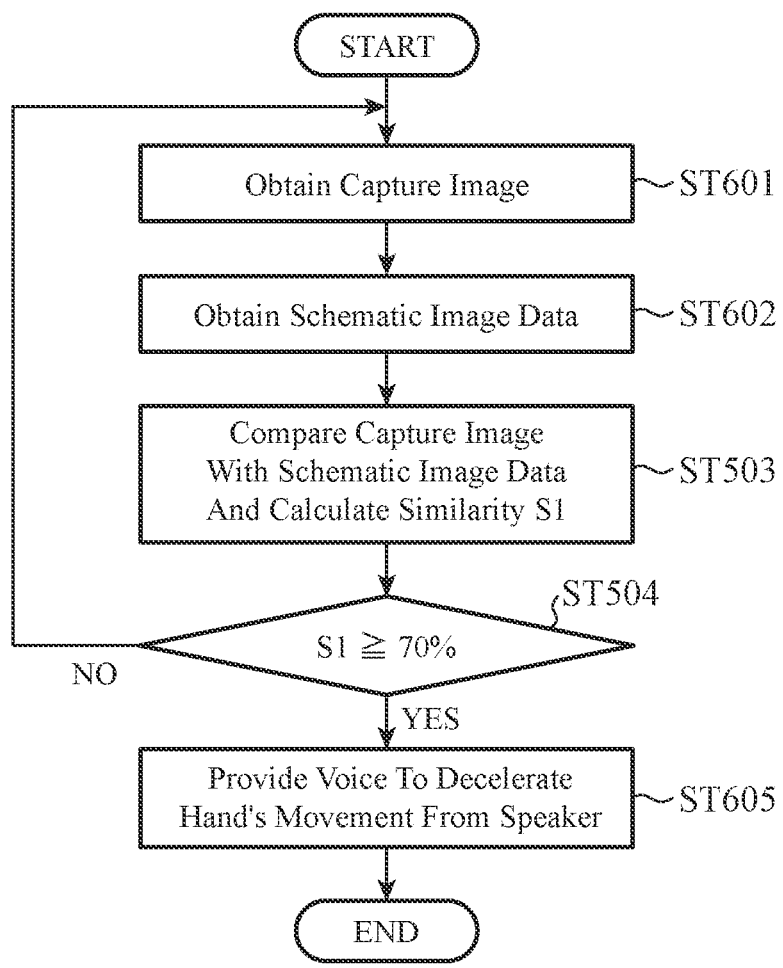
FIG. 6 is a flowchart for describing detailed operations of a target outline determining unit and of a moving speed instruction unit of the image capture assist device according to this first embodiment.

FIG. 6 is a flowchart for describing detailed operations of the target outline determining unit 13 and of the moving speed instruction unit 14 of the image capture assist device 1 according to this first embodiment.

That is, FIG. 6 is a flowchart illustrating a detailed operation at steps ST505 and ST506 of FIG. 5.

The target outline determining unit 13 obtains the capture image from the acquisition unit (step ST601).

In addition, the target outline determining unit 13 accesses the schematic image DB 41 to obtain the schematic image data (step ST602).

The target outline determining unit 13 compares the capture image obtained at step ST601 with the schematic image data obtained at step ST602, and calculates a similarity S1 (step ST603). As used herein, the term "similarity" refers to, for example, known cosine similarity or the like.

Use of the similarity S1 enables the object appearing in the image to be confirmed, and enables determination of whether a candidate inspection target appears in the capture image.

The target outline determining unit 13 compares each of all of objects appearing in the capture image obtained at step ST601 with all pieces of the schematic image data obtained at step ST602 to calculate values of the similarity S1.

The target outline determining unit 13 determines, for each of the objects appearing in the capture image, whether the value of the similarity S1 with each piece of the schematic image data is greater than or equal to 70% (step ST604).

This determination operation is performed on all values of the similarity S1 calculated at step ST603. If any piece of the schematic image data obtained at step ST602 results in a value of the similarity S1 greater than or equal to 70% with any one of the objects appearing in the capture image obtained at step ST601, the target outline determining unit 13 determines that the similarity S1 is greater than or equal to 70%.

If the similarity S1 is greater than or equal to 70% at step ST604 ("YES" at step ST604), the target outline determining unit 13 determines that the object appearing in the capture image matches, in terms of profile or the like, an unobservable target defined in the schematic image data, and thus outputs a determination result indicating that a candidate inspection target appears in the capture image, to the moving speed instruction unit 14.

A match of the object appearing in the capture image with an unobservable target in terms of profile or the like means that the camera 2 has captured an unobservable target that may be the inspection target.

Upon output of the determination result indicating that a candidate inspection target appears in the capture image from the target outline determining unit 13 at step ST604, the moving speed instruction unit 14 causes the speaker 3 to provide a notification indicating that there is a candidate inspection target, and to output an instruction to decelerate the hand's movement, in a form of voice or the like (step ST605).

On the other hand, if the similarity S1 is less than 70% at step ST604 ("NO" at step ST604), the process returns back to step ST601, and the worker continues to search for an unobservable target keeping a high hand's speed. In this operation, the target outline determining unit 13 may cause, for example, the speaker 3 to output an instruction to continue the operation of searching for an unobservable target, such as an instruction saying, "Please continue." in a form of voice or the like.

Operations of the target type determining unit 15, of the shooting location determining unit 16, and of the shooting control unit 17 of the image capture assist device 1 according to this first embodiment will next be described in detail.

Figure 7:
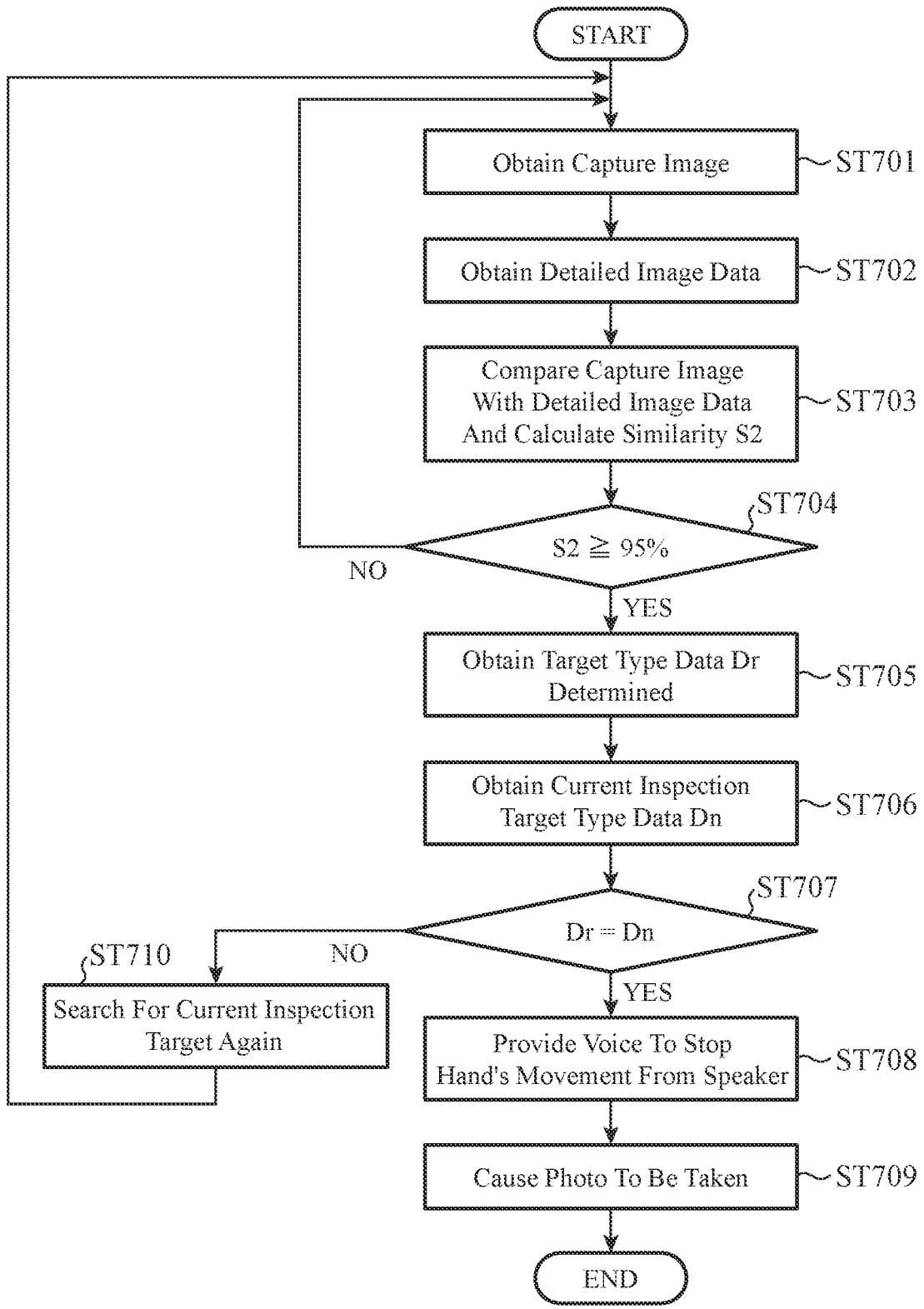
FIG. 7 is a flowchart for describing detailed operations of a target type determining unit, of a shooting location determining unit, and of a shooting control unit of the image capture assist device according to this first embodiment.

FIG. 7 is a flowchart for describing detailed operations of the target type determining unit 15, of the shooting location determining unit 16, and of the shooting control unit 17 of the image capture assist device 1 according to this first embodiment.

That is, FIG. 7 is a flowchart illustrating a detailed operation at steps ST507 to ST509 of FIG. 5.

The target type determining unit 15 obtains the capture image from the acquisition unit (step ST701).

In addition, the target type determining unit 15 accesses the detailed image DB 42 to obtain the detailed image data (step ST702).

The target type determining unit 15 compares the capture image obtained at step ST701 with the detailed image data obtained at step ST702, and calculates a similarity S2 (step ST703). As used herein, the term "similarity" refers to, for example, known cosine similarity or the like.

The target type determining unit 15 compares each of all of objects appearing in the capture image obtained at step ST701 with all pieces of the detailed image data obtained at step ST702 to calculate values of the similarity S2.

The target type determining unit 15 determines, for each of the objects appearing in the capture image, whether the value of the similarity S2 with each piece of the detailed image data is greater than or equal to 95% (step ST704).

This determination operation is performed on all values of the similarity S2 calculated at step ST703. If any piece of the detailed image data obtained at step ST702 results in a value of the similarity S2 greater than or equal to 95% with any one of the objects appearing in the capture image obtained at step ST701, the target type determining unit 15 determines that the similarity S2 is greater than or equal to 95%.

If the similarity S2 is greater than or equal to 95% at step ST704 ("YES" at step ST704), the target type determining unit 15 determines that the object appearing in the capture image matches an unobservable target defined in the detailed image data in terms of properties including the type of the unobservable target, and thus outputs a determination result indicating this situation to the shooting location determining unit 16. In this operation, the target type determining unit 15 also outputs, to the shooting location determining unit 16, information on the unobservable target, defined in the detailed image data, determined to match the object appearing in the capture image.

The shooting location determining unit 16 obtains, from the target type determining unit 15, information on the unobservable target determined to appear in the capture image by the target type determining unit 15, and recognizes that information as target type data Dr (step ST705). For example, if the unobservable target appearing in the capture image matches the image of "meter A" defined in the detailed image data (see FIG. 3), the target type determining unit 15 outputs information representing "meter A" to the shooting location determining unit 16, and the shooting location determining unit 16 thus obtains information of "meter A" as the target type data Dr.

The shooting location determining unit 16 refers to the inspection procedure data of the inspection procedure DB 43, and acquires information on the inspection target that is the target to be currently inspected, as inspection target type data Dn (step ST706). For example, if the inspection procedure data shows that the inspection completion flag is set for each of the inspection targets corresponding to the procedure IDs of P1 and P2, the shooting location determining unit 16 determines that the current inspection target is "meter A" corresponding to the procedure ID of P3, and therefore obtains information representing "meter A" as the inspection target type data Dn.

The shooting location determining unit 16 determines whether the target type data Dr obtained at step ST705 matches the inspection target type data Dn obtained at step ST706 (step ST707).

If the target type data Dr matches the inspection target type data Dn at step ST707 ("YES" at step ST707), the shooting location determining unit 16 determines that the current hand's location is the shooting location, and the shooting location determining unit 16 causes the speaker 3 to output an instruction for the worker to stop the hand (step ST708).

The shooting location determining unit 16 outputs a location determination notification indicating that the shooting location has been determined, to the shooting control unit 17.

Upon output of the location determination notification from the shooting location determining unit 16 at step ST708, the shooting control unit 17 controls the camera 2 to release the shutter at the location at the time of the acquisition of the location determination notification, as the shooting location (step ST709).

On the other hand, if the target type data Dr does not match the inspection target type data Dn at step ST707 ("NO" at step ST707), the shooting location determining unit 16 causes, for example, the speaker 3 to output a notification indicating that the unobservable target is not the inspection target to be currently inspected, thus to instruct the worker to again search for the inspection target (step ST710). The process then returns to step ST701.

Figure 8A:
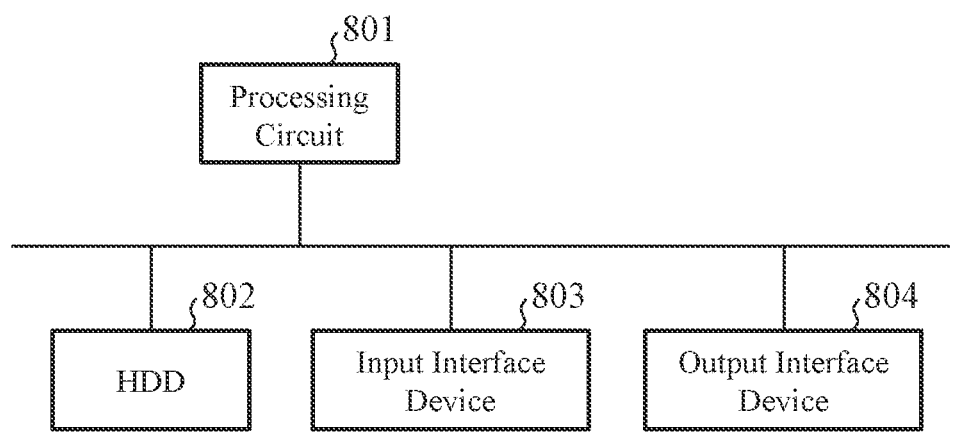
FIGS. 8A and 8B are each a diagram illustrating an example of hardware configuration of the image capture assist device according to the first embodiment of this invention.
Figure 8B:
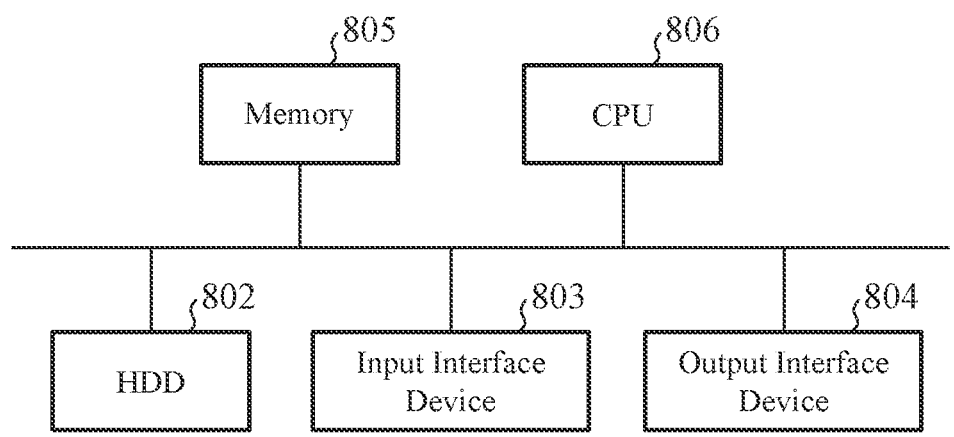

FIGS. 8A and 8B are each a diagram illustrating an example of hardware configuration of the image capture assist device 1 according to the first embodiment of this invention.

In the first embodiment of this invention, the functions of the moving speed calculating unit 11, the moving speed determining unit 12, the target outline determining unit 13, the moving speed instruction unit 14, the target type determining unit 15, the shooting location determining unit 16, and the shooting control unit 17 are implemented by a processing circuit 801. That is, the image capture assist device 1 includes the processing circuit 801 for controlling the process of outputting guidance that assists a worker in the image capturing operation of capturing an image of a target located in an unobservable place, on the basis of a camera image obtained from the camera 2, and of information stored in the pre-generated DB 4.

The processing circuit 801 may be dedicated hardware as illustrated in FIG. 8A, or may be a central processing unit (CPU) 806 that executes a program stored in a memory 805 as illustrated in FIG. 8B.

When the processing circuit 801 is dedicated hardware, the processing circuit 801 is, for example, a single circuit, a composite circuit, a programmed processor, a parallel-programmed processor, an application specific integrated circuit (ASIC), a field-programmable gate array (FPGA), or a combination thereof.

When the processing circuit 801 is the CPU 806, the functions of the moving speed calculating unit 11, the moving speed determining unit 12, the target outline determining unit 13, the moving speed instruction unit 14, the target type determining unit 15, the shooting location determining unit 16, and the shooting control unit 17 are implemented by software, firmware, or a combination of software and firmware. That is, the moving speed calculating unit 11, the moving speed determining unit 12, the target outline determining unit 13, the moving speed instruction unit 14, the target type determining unit 15, the shooting location determining unit 16, and the shooting control unit 17 are implemented in a processing circuit such as the CPU 806 that executes a program stored in a hard disk drive (HDD) 802, the memory 805, or the like; or a system large-scale integration (LSI). It can also be said that programs stored in the HDD 802, the memory 805, or the like cause a computer to perform procedures or methods of the moving speed calculating unit 11, the moving speed determining unit 12, the target outline determining unit 13, the moving speed instruction unit 14, the target type determining unit 15, the shooting location determining unit 16, and the shooting control unit 17. In this regard, the memory 805 is, for example, a non-volatile or volatile semiconductor memory, such as a random access memory (RAM), a read-only memory (ROM), a flash memory, an erasable programmable read-only memory (EPROM), an electrically erasable programmable read-only memory (EEPROM); a magnetic disk, a flexible disk, an optical disk, a compact disc, a MiniDisc, a digital versatile disc (DVD), or the like.

Note that some of the functions of the moving speed calculating unit 11, the moving speed determining unit 12, the target outline determining unit 13, the moving speed instruction unit 14, the target type determining unit 15, the shooting location determining unit 16, and the shooting control unit 17 may be implemented by dedicated hardware, and some of the functions may be implemented by software or firmware. For example, the function of the moving speed calculating unit 11 can be implemented by the processing circuit 801 serving as the dedicated hardware, and the functions of the moving speed determining unit 12, the target outline determining unit 13, the moving speed instruction unit 14, the target type determining unit 15, the shooting location determining unit 16, and the shooting control unit 17 can be implemented by the processing circuit by reading and executing programs stored in the memory 805.

In addition, the memory 805 stores camera image data obtained from the camera 2 and data being processed by the processing circuit 801.

The image capture assist device 1 also includes an input interface device 803 and an output interface device 804 that communicate with the camera 2 and with the speaker 3 included in the mobile terminal 100, or with an external device such as the pre-generated DB 4. The acquisition unit of the image capture assist device 1 includes the input interface device 803.

As described above, the image capture assist device 1 of the first embodiment is configured to include the moving speed determining unit 12 that determines whether or not a moving speed of the camera 2 is greater than or equal to a threshold, the target outline determining unit 13 that, if the moving speed determining unit 12 has determined that the moving speed of the camera 2 is greater than or equal to the threshold, determines, on the basis of a capture image obtained from the camera 2, whether a candidate inspection target, being an object that may be a target to be inspected, appears in that capture image, the moving speed instruction unit 14 that, if the target outline determining unit 13 has determined that the candidate inspection target appears in the capture image, outputs an instruction to reduce the moving speed of the camera 2, the target type determining unit 15 that, if the moving speed determining unit 12 has determined that the moving speed of the camera 2 is less than the threshold, determines a type of a target appearing in that capture image on the basis of the capture image, and the shooting location determining unit 16 that determines whether the type of the target determined by the target type determining unit 15 matches a type of an inspection target to be currently inspected, and if the type of that target matches the type of the inspection target, determines that a current location of the camera is the shooting location, and outputs an instruction to stop the movement of the camera. Thus, the hand's movement is guided in two stages depending on the speed of hand's movement searching for the target located in an unobservable place. This enables the user to be assisted in the image capturing operation to allow the user to capture an image of the unobservable target in a frame within an appropriate angle range.

In addition, the image capture assist device 1 of the first embodiment is configured to also include a shooting control unit 17 that, upon determination of the shooting location by the shooting location determining unit 16, outputs an instruction on shooting, to the camera 2. This enables the inspection target to be automatically shot at an appropriate angle.

Second Embodiment

In the first embodiment, when the shooting location determining unit 16 determines that the unobservable target identified by the target type determining unit 15 does not match the inspection target defined in the inspection procedure data, the shooting location determining unit 16 causes, for example, the speaker 3 to output a notification indicating that the unobservable target identified is not the inspection target to be currently inspected, thus to instruct the worker to again search for the inspection target.

In this second embodiment, an embodiment will be described in which when the shooting location determining unit 16 has determined that the unobservable target identified by the target type determining unit 15 does not match the inspection target defined in the inspection procedure data, the worker is directed to face the camera 2 toward the inspection target.

Figure 9:
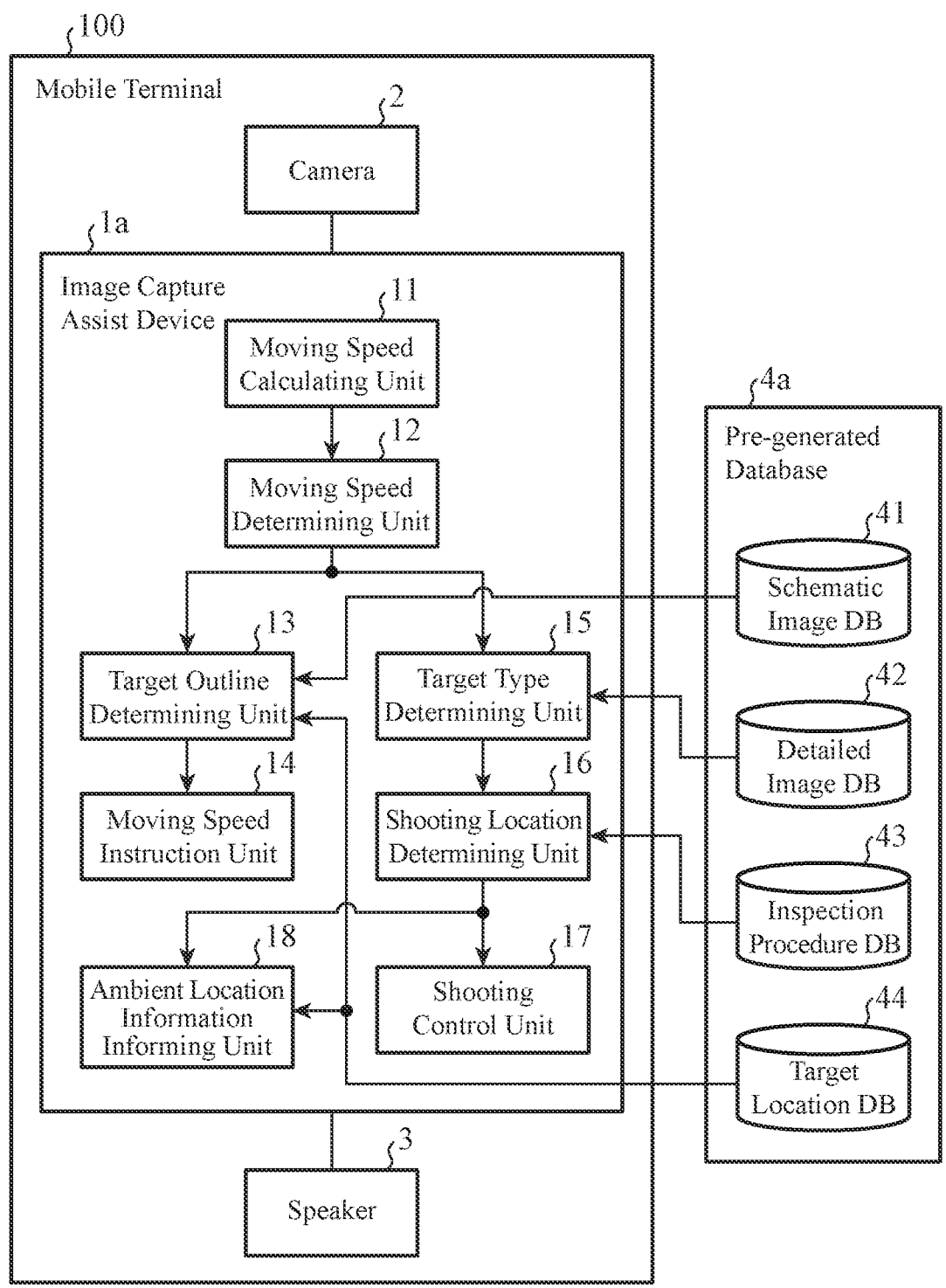
FIG. 9 is a block diagram illustrating a functional configuration of an image capture assist device according to a second embodiment of this invention.

FIG. 9 is a block diagram illustrating a functional configuration of an image capture assist device 1a according to the second embodiment of this invention.

Similarly to the first embodiment, the image capture assist device 1a according to this second embodiment is disposed in the mobile terminal 100, such as a smartphone or a tablet, that includes the camera 2, a certain type of sensor (not shown) such as an acceleration sensor or a gyro sensor, and the speaker 3.

This second embodiment also assumes, by way of example, that the mobile terminal 100 including the image capture assist device 1a is a mobile terminal carried by a worker who is a user in maintenance and inspection operations of machinery, such as a water treatment facility, a plant facility, a power generation facility, or a building facility.

As illustrated in FIG. 9, the image capture assist device 1a according to the second embodiment of this invention differs from the image capture assist device 1 according to the first embodiment described with reference to FIG. 1 in further including an ambient location information informing unit 18. Other components similar to the components of the image capture assist device 1 according to the first embodiment are designated by like reference characters, and duplicate description will be omitted.

In addition, the image capture assist device 1a is to access a pre-generated database 4a, which differs in further including a target location DB 44 in addition to the schematic image DB 41, the detailed image DB 42, and the inspection procedure DB 43. The target location DB 44 will be described in detail later.

If the shooting location determining unit 16 has determined that the unobservable target identified by the target type determining unit 15 does not match the inspection target identified from the inspection procedure data stored in the inspection procedure DB 43, the ambient location information informing unit 18 causes the speaker 3 to output voice information or the like indicating at which position the inspection target is located with respect to the current location of the camera 2.

As illustrated in FIG. 10, assume, for example, that the current angle of view of the camera 2 is directed to frame a switch B, and that a switch A which is the inspection target to be currently inspected is located to the left of the switch B.

In this case, the ambient location information informing unit 18 causes, for example, the speaker 3 to output a voice message saying, "Switch B was detected. The switch A which is the target to be currently inspected is located to the left of it", thus to instruct the worker about the location of the right inspection target. In this operation, the ambient location information informing unit 18 calculates the location of the right inspection target on the basis of the target location data stored in the target location DB 44.

Now FIG. 11 is a set of diagrams illustrating an example of the target location data stored in the target location DB 44 in this second embodiment.

As illustrated in FIG. 11, the target location data includes, for example, image data that depicts in detail unobservable targets, one of which may be the inspection target, using a two-dimensional or three dimensional point cloud model or the like (FIG. 11A); and information of center coordinate sets of the respective unobservable targets, one of which may be the inspection target, on the two-dimensional image or three-dimensional point cloud model (FIG. 11B).

Note that the center coordinate sets of the respective targets are set in advance by the worker or the like. Specifically, for example, the worker or the like captures an image of one or multiple unobservable targets at a certain location, and sets center coordinate sets of the respective unobservable targets in the image captured. When there are the multiple unobservable targets, the center coordinate sets of the respective unobservable targets are information for determining location relationship between the unobservable targets.

Note that FIG. 11A illustrates image data depicting in detail the unobservable targets provided on a panel A, of the unobservable targets, one of which may be the inspection target.

If the shooting location determining unit 16 has determined that the unobservable target identified by the target type determining unit 15 does not match the inspection target identified from the inspection procedure data stored in the inspection procedure DB 43, the ambient location information informing unit 18 calculates the location of the inspection target on which the worker will be instructed, on the basis of the capture image and of the image from the target location data as illustrated in FIG. 11A.

Figure 12A:
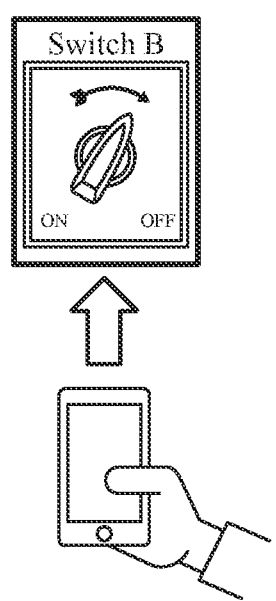
FIG. 12 is a set of diagrams for describing an example of a method for an ambient location information informing unit to calculate a location of the inspection target on which the worker is instructed, on the basis of the capture image and of the image from the target location data, in the second embodiment.

A specific description will be provided below on the assumption that the target location data is as illustrated in FIG. 11, and that the capture image is as illustrated in FIG. 12A when the right inspection target to be inspected is the switch A provided on the panel A.

First, the ambient location information informing unit 18 performs matching between the capture image and the image from the target location data, and determines to which portion the capture image corresponds in the image from the target location data set in advance.

The ambient location information informing unit 18 may use a conventional technique as the matching technique, such as template matching, scale-invariant feature transform (SIFT) features, or speed-up robust features (SURF) features.

It is assumed here that the capture image shows the switch B, which is an unobservable target provided on the panel A (see FIG. 12A), and the inspection target is the switch A, which is another unobservable target provided on the panel A (see FIG. 11A).

Figure 12B:
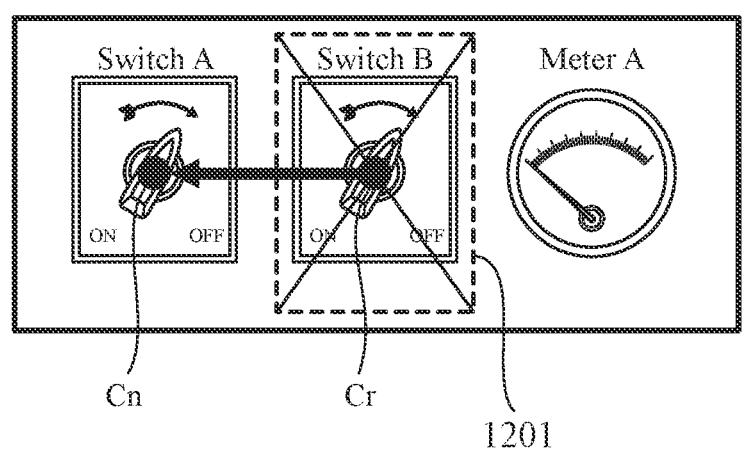

Thus, the ambient location information informing unit 18 performs matching between the image as illustrated in FIG. 12A and the image from the target location data as illustrated in FIG. 11A, and determines to which portion the capture image corresponds in the image from the target location data. As a result, the ambient location information informing unit 18 determines that the region indicated by the reference numeral 1201 in FIG. 12B is the region appearing in the capture image.

Next, on the basis of the information on the center coordinate sets of the respective unobservable targets, one of which may be the inspection target, on the two-dimensional image or three-dimensional point cloud model in the target location data (see FIG. 11B), the ambient location information informing unit 18 identifies a center coordinate set Cr of the switch B on the image from the target location data, as a location coordinate set corresponding to a center coordinate set of the switch B on the capture image.

Then, the ambient location information informing unit 18 compares the center coordinate set Cr identified, with a center coordinate set Cn of the switch A, which is the inspection target, on the image from the target location data, and calculates the location at which the switch A, which is the inspection target, is located with respect to the current location of the camera 2 where the capture image has been captured.

In the example described above, because the center coordinate set Cr, which is the location coordinate set corresponding to the center coordinate set of the switch B appearing in the capture image, is (200, 100), and the center coordinate set Cn of the switch A, which is the inspection target, is (100, 100), the ambient location information informing unit 18 calculates that the switch A is located to the left with respect to the location of the camera 2.

Note that the above description describes that if the shooting location determining unit 16 determines that the unobservable target identified by the target type determining unit 15 does not match the inspection target identified from the inspection procedure data stored in the inspection procedure DB 43, the ambient location information informing unit 18 causes the speaker 3 to output voice information or the like informing the user at which position the inspection target is located with respect to the current location of the camera 2. However, the method of informing the worker about the inspection target is not limited thereto.

For example, the ambient location information informing unit 18 may cause the speaker 3 to output voice information or the like informing the user of the distance from the current location of the camera 2 to the inspection target. The ambient location information informing unit 18 may also cause the speaker 3 to output voice information or the like informing the user in which direction the inspection target is located with respect to the current location of the camera 2.

As described in the above example, the ambient location information informing unit 18 can calculate the distance from the location of the camera 2 to the inspection target, for example, on the basis of the center coordinate set Cr corresponding to the center coordinate set of the switch B appearing in the capture image, and of the center coordinate set Cn of the switch A, which is the inspection target. In the example described above, the center coordinate set Cn (100, 100) is at a location to the left by the distance equivalent to a coordinate of 100 with respect to the center coordinate set Cr (200, 100).

The ambient location information informing unit 18 calculates the distance equivalent to a coordinate of 100 using a ratio that has been obtained in advance by calculating a value in centimeters equivalent to a coordinate of 100. This ratio is, for example, a ratio between the distance between unobservable targets, one of which may be an inspection target, measured in advance in a real space, and the difference of corresponding coordinate values on an image from the target location data. In addition, information of this ratio is stored, as ratio information, in a location where the image capture assist device 1a can access, and the ambient location information informing unit 18 can calculate the distance equivalent to a coordinate of 100 on the basis of this ratio information.

The hardware configuration of the image capture assist device 1a according to the second embodiment of this invention is similar to the hardware configuration described with reference to FIGS. 8A and 8B in the first embodiment, and therefore, duplicate description will be omitted.

The ambient location information informing unit 18 is implemented by the processing circuit 801 similarly to the moving speed calculating unit 11, the moving speed determining unit 12, the target outline determining unit 13, the moving speed instruction unit 14, the target type determining unit 15, the shooting location determining unit 16, and the shooting control unit 17.

An operation of the image capture assist device 1a according to this second embodiment will next be described.

Figure 13:
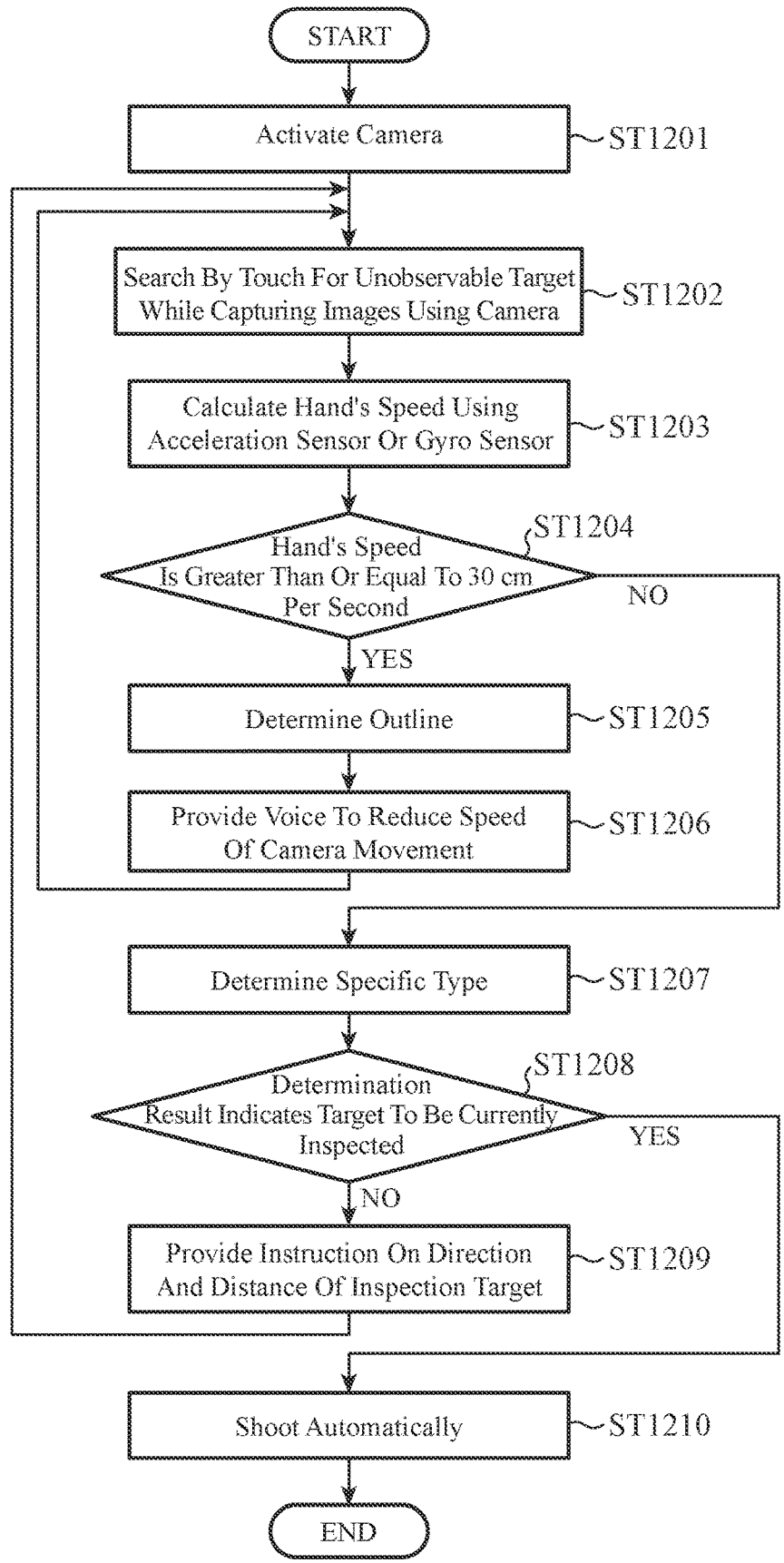
FIG. 13 is a flowchart for describing an overall operation of the image capture assist device according to this second embodiment.

FIG. 13 is a flowchart for describing an overall operation of the image capture assist device 1a according to this second embodiment.

In FIG. 13, specific operations at steps ST1201 to ST1208 and at step ST1210 are respectively similar to the specific operations at steps ST501 to ST508 and at step ST509 of FIG. 5 described in the first embodiment, and therefore, duplicate description will be omitted; and a specific operation at step ST1209 of FIG. 13 will be described below.

The shooting location determining unit 16 determines whether the unobservable target identified by the target type determining unit 15 at step ST1207 matches the inspection target defined in the inspection procedure data (step ST1208), and if a match is found ("YES" at step ST1208), the process proceeds to step ST1210.

If the unobservable target identified by the target type determining unit 15 does not match the inspection target defined in the inspection procedure data at step ST1208 ("NO" at step ST1208), the shooting location determining unit 16 outputs information on the unobservable target identified by the target type determining unit 15 and information on the inspection target defined in the inspection procedure data to the ambient location information informing unit 18.

The ambient location information informing unit 18 causes the speaker 3 to output voice information or the like informing the user that in which direction and by how much distance the inspection target that is the right inspection target is located with respect to the current location of the camera 2, on the basis of the information on the unobservable target identified by the target type determining unit 15 and of the information on the inspection target, output from the shooting location determining unit 16 at step ST1208 (step ST1209). For example, when the unobservable target identified by the target type determining unit 15 is "switch B", and the inspection target is "switch A", the ambient location information informing unit 18 causes a notification indicating that the inspection target is near, such as a notification saying, "Switch B was detected. The switch A to be currently inspected is located to the left of it", to be output. The process then returns to step ST1202.

An operation of the ambient location information informing unit 18 of the image capture assist device 1a according to this second embodiment will next be described in detail.

Figure 14:
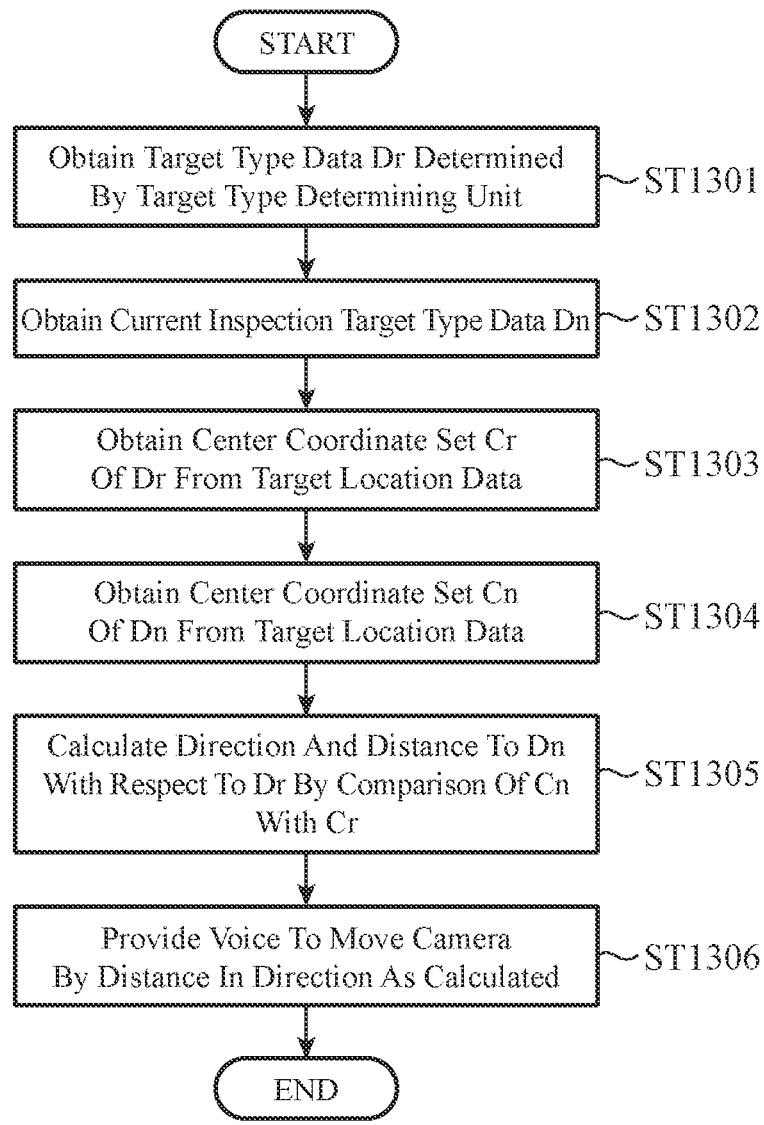
FIG. 14 is a flowchart for describing a detailed operation of the ambient location information informing unit of the image capture assist device according to this second embodiment.

FIG. 14 is a flowchart for describing a detailed operation of the ambient location information informing unit 18 of the image capture assist device 1a according to this second embodiment.

That is, FIG. 14 is a flowchart for describing the detailed operation at step ST1209 of FIG. 13.

The ambient location information informing unit 18 obtains information of the target type data Dr from the shooting location determining unit 16 (step ST1301). Note that the target type data Dr is information that has been set by the shooting location determining unit 16 for the unobservable target identified by the target type determining unit 15 (see step ST705 of FIG. 7).

The ambient location information informing unit 18 obtains information of the inspection target type data Dn from the shooting location determining unit 16 (step ST1302). Note that the inspection target type data Dn is information on the inspection target, obtained by the shooting location determining unit 16 by referring to the inspection procedure data of the inspection procedure DB 43 (see step ST706 of FIG. 7).

The ambient location information informing unit 18 refers to the target location data stored in the target location DB 44, and obtains the center coordinate set Cr, defined in the target location DB 44, of the unobservable target whose type matches the target type data Dr (step ST1303).

Similarly, the ambient location information informing unit 18 obtains the center coordinate set Cn, defined in the target location DB 44, of the unobservable target whose type matches the inspection target type data Dn (step 1304).

Specifically, for example, when the target type data Dr is "switch B", and the inspection target type data Dn is "switch A", the ambient location information informing unit 18 obtains information of center coordinate sets (200, 100) and (100, 100) respectively as the center coordinate set Cr and as the center coordinate set Cn.

The ambient location information informing unit 18 calculates the direction and the distance to the inspection target corresponding to the inspection target type data Dn with respect to the unobservable target corresponding to the target type data Dr, on the basis of the center coordinate set Cr obtained at step ST1303 and of the center coordinate set Cn obtained at step ST1304 (step ST1305).

For example, in the example described above, the center coordinate set Cn (100, 100) is at a location to the left by the distance equivalent to a coordinate of 100 with respect to the center coordinate set Cr (200, 100). That is, the inspection target corresponding to the inspection target type data Dn is located at a location moved to the left from the unobservable target corresponding to the target type data Dr by the distance equivalent to a coordinate of 100.

The ambient location information informing unit 18 calculates the movement distance equivalent to a coordinate of 100 on the basis of the ratio information defined and stored in advance as described above.

The ambient location information informing unit 18 causes the speaker 3 to output a voice or the like that instructs the user to move the camera 2 by the distance and in the direction calculated at step ST1305 (step ST1306).

This example has been described in which the ambient location information informing unit 18 calculates the direction and the distance to the inspection target corresponding to the inspection target type data Dn with respect to the unobservable target corresponding to the target type data Dr, and causes the speaker 3 to output a voice or the like that instructs the user to move the camera 2 by the distance and in the direction calculated. However, note that this is merely by way of example. As described above, the ambient location information informing unit 18 can also be configured to calculate the location of the inspection target corresponding to the inspection target type data Dn relative to the unobservable target corresponding to the target type data Dr, and to cause the speaker 3 to output a voice or the like that instructs the user to move the camera 2 to the location calculated.

The above description assumes that, as illustrated in FIG. 11, the target location DB 44 stores, as target location data, image data that depicts in detail unobservable targets, one of which may be the inspection target, using a two-dimensional or three dimensional point cloud model or the like; and information of center coordinate sets of these unobservable targets.

Figure 15:
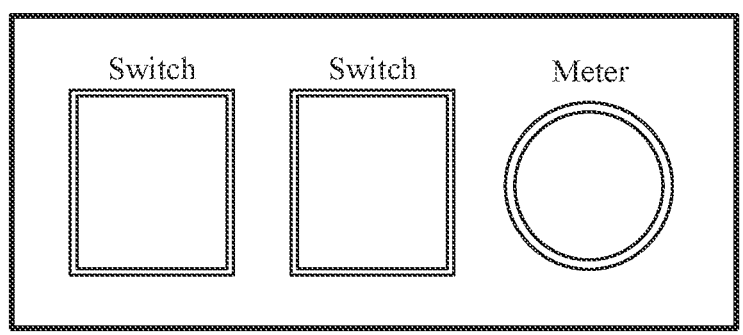
FIG. 15 is a diagram illustrating an example of target location data stored in the target location DB in this second embodiment.

In addition to this, the target location DB 44 may be configured to store, as target location data, image data that depicts outlines of unobservable targets, one of which may be the inspection target, using a two-dimensional or three dimensional point cloud model or the like, as illustrated in FIG. 15.

If the moving speed determining unit 12 has determined that the hand's speed is greater than or equal to a predetermined speed ("YES" at step ST1204), the target outline determining unit 13 determines whether a candidate inspection target appears in the capture image (step ST1205). In this operation, even if an object seeming to be a candidate inspection target does not appear in the camera image, the target outline determining unit 13 may be configured to infer that the camera 2 is approaching a candidate inspection target from target location data as illustrated in FIG. 15 and from the current moving direction of the camera 2, and to output information indicating that the camera 2 is approaching a candidate inspection target to the moving speed instruction unit 14 as a determination result. The moving speed instruction unit 14 may then cause the speaker 3 to output a voice or the like that informs the worker that a candidate inspection target is in the vicinity, and that instructs the user to decelerate the hand's movement.

As described above, the image capture assist device 1*a* of the second embodiment is configured to include the ambient location information informing unit 18 that, when there are multiple unobservable targets, one of which may be the target to be inspected, and if it is determined that a type of an unobservable target identified by the target type determining unit 15 does not match a type of an inspection target, causes information indicating the direction of the inspection target with respect to the camera 2 to be output, on the basis of the target location data including both the image data that depicts in detail the multiple unobservable targets, one of which may be the target, and the information for determining location relationship between the multiple targets. This can guide the worker to allow shooting of the right inspection target.

Note that although the described first and second embodiments assume existence of multiple unobservable targets, there may exist only one unobservable target.

In addition, in the described first and second embodiments, the target outline determining unit 13 determines that a candidate inspection target appears in the capture image when the similarity S1 is greater than or equal to 70%, and the target type determining unit 15 determines that the object appearing in the capture image matches an unobservable target defined in the detailed image data in terms of type thereof when the similarity S2 is greater than or equal to 95%; however, the values for the similarity S1 and of the similarity S2 are not limited thereto. The values for the similarity S1 and of the similarity S2 may be set as appropriate.

Moreover, the present invention covers any combination of the embodiments described herein, modifications of any component in the embodiments, or omissions of any component in the embodiments that fall within the scope of the invention.

INDUSTRIAL APPLICABILITY

An image capture assist device according to this invention is configured to enable a user to capture an image of an unobservable target in a frame within an appropriate angle range, and is therefore can be used in an image capture assist device, an image capture assist method, and the like that assist image capturing using a camera.

REFERENCE SIGNS LIST

1, 1*a*: Image capture assist device, 2: Camera, 3: Speaker, 4, 4*a*: Pre-generated database, 11: Moving speed calculating unit, 12: Moving speed determining unit, 13: Target outline determining unit, 14: Moving speed instruction unit, 15: Target type determining unit, 16: Shooting location determining unit, 17: Shooting control unit, 18: Ambient location information informing unit, 41: Schematic image DB, 42: Detailed image DB, 43: Inspection procedure DB, 44: Target location DB, 100: Mobile terminal, 801: Processing circuit, 802: HDD, 803: Input interface device, 804: Output interface device, 805: Memory, 806: CPU.

The invention claimed is:

1. An image capture assist device comprising:
processing circuitry
to determine whether or not a moving speed of a camera is greater than or equal to a threshold;
if it has been determined that the moving speed of the camera is greater than or equal to the threshold, to determine, on a basis of a capture image obtained from the camera, whether a candidate inspection target, being an object that may be a target to be inspected, appears in the capture image;
if it has been determined that the candidate inspection target appears in the capture image, to output an instruction to reduce the moving speed of the camera;
if it has been determined that the moving speed of the camera is less than the threshold, to determine a type of a target appearing in the capture image on a basis of the capture image; and
to determine whether the type of the target determined matches a type of an inspection target to be currently inspected, and if the type of the target matches the type of the inspection target, to determine that a current location of the camera is a shooting location, and to output an instruction to stop a movement of the camera.

2. The image capture assist device according to claim 1, wherein the processing circuitry outputs a shooting instruction to the camera upon determination of the shooting location.

3. The image capture assist device according to claim 1, wherein the processing circuitry
detects the target by comparing an object appearing in the capture image with schematic image data that represents a profile of a target that may be the inspection target.

4. The image capture assist device according to claim 1, wherein the processing circuitry determines the type of the target by comparing an object appearing in the capture image with detailed image data in which a target that may be the inspection target appears clearly.

5. The image capture assist device according to claim 1, wherein the processing circuitry
identifies the inspection target on a basis of information of a type of a target that may be the inspection target, and of inspection procedure data defining an inspection procedure for the target, and determines whether the type of the target determined matches the type of the inspection target.

6. The image capture assist device according to claim 1, wherein there are multiple targets, one of which may be the target to be inspected, and
the processing circuitry, if it has been determined that the type of the target does not match the type of the inspection target, causes information indicating a direction of the inspection target with respect to the camera to be output, on a basis of target location data including both image data that depicts in detail the multiple targets, one of which may be the target, and information for determining location relationship between the multiple targets.

7. An image capture assist method comprising:

determining whether or not a moving speed of a camera is greater than or equal to a threshold;

if it has been determined that the moving speed of the camera is greater than or equal to the threshold, determining, on a basis of a capture image obtained from the camera, whether a candidate inspection target, being an object that may be a target to be inspected, appears in the capture image;

if it has been determined that the candidate inspection target appears in the capture image, outputting an instruction to reduce the moving speed of the camera;

if it has been determined that the moving speed of the camera is less than the threshold, determining a type of a target appearing in the capture image on a basis of the capture image; and determining whether the type of the target determined matches a type of an inspection target to be currently inspected, and if the type of the target matches the type of the inspection target, determining that a current location of the camera is a shooting location, and outputting an instruction to stop a movement of the camera.

* * * * *